US008718622B2

(12) United States Patent  (10) Patent No.: US 8,718,622 B2
Erhart et al.  (45) Date of Patent: May 6, 2014

(54) PERVASIVE CONTACT CENTER

(75) Inventors: George Erhart, Loveland, CO (US);
Valentine Matula, Granville, OH (US);
David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 708 days.

(21) Appl. No.: 12/888,225

(22) Filed: Sep. 22, 2010

(65) Prior Publication Data

US 2012/0071145 A1  Mar. 22, 2012

(51) Int. Cl.
*H04M 3/00* (2006.01)

(52) U.S. Cl.
USPC ........ 455/414.4; 455/415; 455/410; 704/275; 704/9; 704/231; 704/257; 704/270

(58) Field of Classification Search
USPC ................................. 455/414.2, 414.3, 456.3
See application file for complete search history.

(56) References Cited

U.S. PATENT DOCUMENTS

| 6,801,604 | B2 | 10/2004 | Maes et al. | |
| 2003/0050075 | A1* | 3/2003 | Rangarajan et al. | 455/456 |
| 2005/0286688 | A1* | 12/2005 | Scherer | 379/88.21 |
| 2007/0203735 | A1* | 8/2007 | Ashton | 705/1 |
| 2009/0006077 | A1* | 1/2009 | Keaveney | 704/9 |
| 2009/0228281 | A1* | 9/2009 | Singleton et al. | 704/275 |
| 2010/0080368 | A1 | 4/2010 | Erhart et al. | |
| 2010/0153171 | A1 | 6/2010 | Erhart et al. | |
| 2011/0055412 | A1* | 3/2011 | Kongalath et al. | 709/228 |
| 2011/0170673 | A1* | 7/2011 | Dutta et al. | 379/88.04 |

FOREIGN PATENT DOCUMENTS

WO  WO 2010084497 A1 * 7/2010

OTHER PUBLICATIONS

Erhart et al., U.S. Appl. No. 12/240,256, Entitled "Monitoring Responsive Objects in Vehicles", filed Sep. 29, 2008, 12 pages.
Erhart et al., U.S. Appl. No. 12/242,475, Entitled "Proxy-Based, Transaction Authorization System", filed Sep. 30, 2008, 18 pages.
Erhart et al., U.S. Appl. No. 12/242,005, Entitled "Proxy-Based Payment System for Portable Objects", filed Sep. 30, 2008, 17 pages.
Erhart et al., U.S. Appl. No. 12/566,558, Entitled "Location-Aware Retail Application", filed Sep. 24, 2009, 15 pages.
Erhart et al., U.S. Appl. No. 12/328,620, Entitled "Proxy-Based Reservation Scheduling System", filed Dec. 4, 2008, 14 pages.
Erhart et al., U.S. Appl. No. 12/490,247, Entitled "Servicing Calls in Call Centers Based on Caller Geo-Location", filed Jun. 23, 2009, 24 pages.

* cited by examiner

*Primary Examiner* — Charles Appiah
*Assistant Examiner* — Randy Peaches
(74) *Attorney, Agent, or Firm* — Sheridan Ross P.C.

(57) ABSTRACT

Methods and systems that support the receipt of location data and/or touch data from a mobile communication device are provided. More particularly, a mobile customer service server is provided that can receive location data from or regarding a mobile communication device, and associate that location data with recognition data. The recognition data can in turn be delivered to other server side components, and used to select content to be returned to the mobile communication device. The mobile customer service server can also receive touch data input to the mobile communication device, and can provide recognition data related to the touch input to other server side component. Server side components provided with location or touch data by the mobile customer service server do not themselves need to natively support location recognition or touch recognition capabilities.

15 Claims, 4 Drawing Sheets

PERVASIVE CONTACT CENTER

FIELD

The present invention is directed to a pervasive contact center. In particular, a mobile customer service architecture that provides persistent and/or context based contact is disclosed.

BACKGROUND

Mobile communication devices, such as cellular telephones, are in widespread use. In association with such mobile devices, location determination techniques have been developed. Such location determination techniques allow the location of a wireless device to be determined. This in turn has stimulated the development of applications that make use of the location of a mobile device.

Mobile device applications, location based or otherwise, have been developed that are capable of receiving and/or processing various inputs. Such inputs can include selections made by a user of the mobile device. Examples of selections include selecting a displayed button using a touch screen to indicate the user's desire to perform an action represented by a label. As further examples, the user of a mobile device can enter information and make selections on an ad hoc basis, or through an application menu structure.

Although various applications that can receive and/or apply location based and/or touch based information have been developed, their use has been limited. For example, server side devices with which a mobile device may interact may not be capable of receiving location based and/or touch based information, and acting on or otherwise utilizing such information. Accordingly, uses of location based and/or touch based information associated with a mobile device have been limited.

SUMMARY

Methods and systems set forth in the present disclosure are directed to solving these and other problems and disadvantages of the prior art. In particular, methods and systems are provided that communicate location and/or touch data from a mobile device to a mobile customer service server. The mobile customer service server is provided with a location and/or touch grammar, that allows the mobile customer service server to recognize a pattern specified by the applicable grammar. The recognized pattern can then be associated with recognition data by the mobile customer service server.

The mobile customer service server can perform data recognition on behalf of various server side devices. For example, the recognition data can be provided to a voice portal and/or a multimedia agent. The recognition data can then be applied by the voice portal and/or the multimedia agent. More particularly, recognition data can be used to select or identify content for delivery to the mobile communication device. For example, content relevant to a particular location of a mobile communication device can be pushed to that mobile communication device. A user of the mobile communication device can also provide input in the form of touch data. For example, a user can select a virtual button displayed by the mobile communication device to indicate a desire to receive additional content. The touch data is provided to the mobile customer service server for recognition, and for the identification of the particular item of content requested by the user of the mobile communication device.

A communications system in accordance with embodiments of the present invention includes one or more mobile communication devices capable of receiving inputs in various formats. These inputs can include location data and/or touch data. Data input from the mobile communication device is provided to server side components by a communication network. The server side components include a mobile customer service server, capable of acting as an adapter for other server side components, at least with respect to location data and/or touch data. Other server side components can include a voice portal server, a multimedia server, a dialog design or application server, and/or an enterprise data store.

In accordance with embodiments of the present invention, a pervasive contact center is provided in which persistent and/or context based contact is provided. Moreover, a persistent session can be comprised of smaller communications sessions. For example, location information regarding a mobile communication device can be provided to server side components, and used to select content, that in the context of the mobile communication device location, is considered relevant. That content can then be delivered to the mobile communication device. A user of the mobile communication device can then access the content. Selections made related to the delivered content, for example in the form of touch input, can be passed from the mobile communication device to the server side components, to provide a basis for further sessions as part of the larger persistent session. Such further sessions can include, for example, voice and/or video telephony sessions with a human agent, and/or the delivery of additional content, such as multimedia content, to the mobile communication device, so that such content can be accessed by the user of the device.

Additional features and advantages of the present disclosure will become more readily apparent from the following description, particularly when taken together with the accompanying drawings.

DETAILED DESCRIPTION

Figure 1:
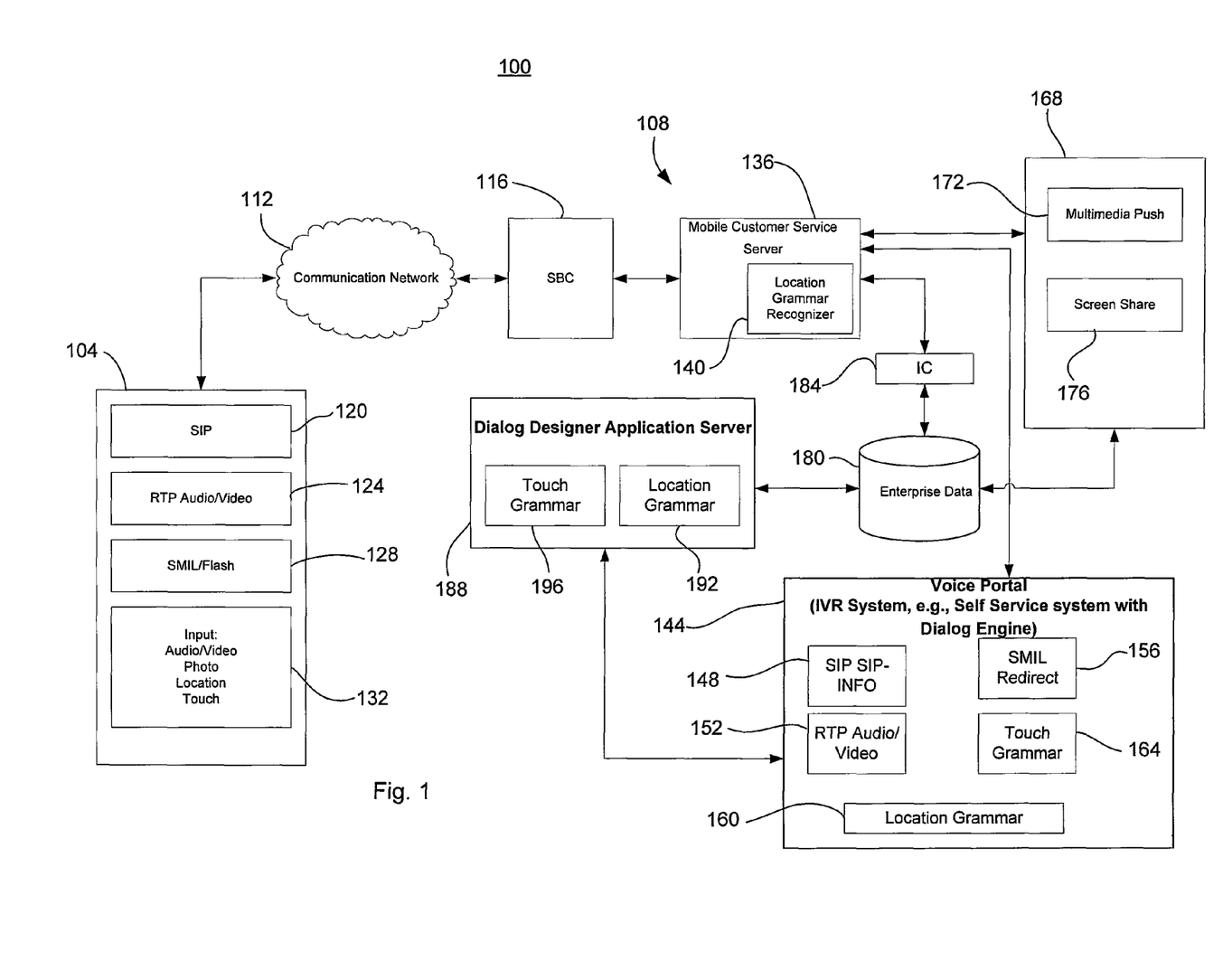
FIG. 1 is a block diagram depicting a communications system in accordance with at least some embodiments of the disclosed invention.

With reference initially to FIG. 1, an exemplary communications system 100 is depicted. More specifically, the communications system 100 may comprise one or more mobile communication devices 104 that are in communication with server side components 108 through a communication network 112. In addition, a session border controller 116 may be interposed between the server side components 108 and the communication network 112.

The mobile communication device 104 may be associated with a number of functions, modules, and/or applications. For example, a session initiation protocol module 120 may be provided. In addition, the mobile communication device 104 will generally be associated with a real time protocol communication module 124, such as a real time protocol audio/ video module. A mobile communication device 104 in accordance with the present disclosure may additionally include presentation software, such as a synchronized multimedia integration language (SMIL) or flash component or module 128, that allows application created dynamic video to be displayed to a user of the mobile communication device 104. In addition, the mobile communication device 104 may be associated with various inputs 132, such as audio/video, photograph, location data, or touch data.

The communication network 112 may comprise any type and any number of communication mediums capable of supporting communications sessions, such as voice calls, video calls, chats, emails, PTY calls, multimedia sessions, or the like. The communication network 112 may include a LAN, a WAN, a SIP network, or any other type of packet switched or circuit switched network known in the art. In addition, it can be appreciated that the communication network 112 need not be limited to any one network type, and instead may be comprised of a number of different networks and/or network types. The communication network 112 may include an IP multimedia subsystem (IMS) network, an architectural SIP standard well known in the art, or any other type of network that provides access to one or more of the Internet, a standard plain old telephone system (POTS), an integrated services digital network (ISDN), the public switched telephony network (PSTN), and/or any type of known cellular or other wireless communication network. Moreover, the communication network 112 may comprise the Internet. Accordingly, the communication network 112 is equipped to facilitate and support communications between a mobile communication device 104 and a server side component 108 via one or more communication media and/or modalities.

The server side components 108 include a mobile customer service server 136. The mobile customer service server 136, as described herein, operates as an adapter with respect to location and/or touch data passed to the mobile customer service server 136 by the mobile communication device 104, particularly where various components of the server side components 108 lack an interface for location and/or touch data. Moreover, the mobile customer service server 136 acts as a façade to provide a unified interface to integrate multiple subsystems that lack location and/or touch functionality. The mobile customer service server 136 can also act as a proxy to provide default functions, or as a place holder for missing functionality. In accordance with embodiments of the disclosed invention, the mobile customer service server 136 can include a location grammar recognizer 140. In general, the location grammar recognizer 140 operates to associate location data with recognized data according to the location grammar.

A voice portal server 144 may be interconnected to the mobile customer service server 136. In general, the voice portal server 144 can include various modules, applications, or functions. These can include a session initiation protocol information module 148, a real time protocol audio/video module 152, a multimedia presentation redirection module 156, a location grammar module 160, and a touch grammar module 164. As will be described in greater detail elsewhere herein, the voice portal server 144 can provide a location grammar 160 to the location grammar recognizer 140 of the mobile customer service server 136, in order to specify the grammar that contains patterns to be recognized and tokens to return for each recognized pattern.

A multimedia server 168 is provided for delivering multimedia content. The multimedia server 168 generally includes a number of modules. These modules can include a multimedia push module 172 that can provide multimedia data to a mobile device 104 via the mobile customer service server 136. Alternatively or in addition, the multimedia agent 168 can include a screen share module 176, for displaying data to an agent associated with the multimedia agent server 168 and the user of the mobile device 104 simultaneously. Examples of a screen share module 176 can include a whiteboard application.

The server side components 108 can additionally include a store or repository of enterprise data 180. The repository of enterprise data 180 can include various information, content, or other data that can be applied and/or delivered by components of the server side system 108. In accordance with embodiments of the present invention, the enterprise data store 180 can be interconnected to the mobile customer service server 136 via an interaction center 184. In addition, the enterprise data store 180 can provide data to the multimedia agent server 168. Examples of data provided to the multimedia agent server 168 include customer information regarding the user of a mobile communication device 104, data regarding items or other information correlated to a particular location, multimedia content, etc.

A dialogue designer application server 188 can also be included in the server side system 108. The dialogue designer application server can include a location grammar module 192, and a touch grammar module 196. The location grammar 192 and touch grammar 196 modules provide basic grammar recognition. In addition, the location grammar 192 and touch grammar 196 modules provide a means for receiving location or touch grammar information from the voice portal server 144. Moreover, the dialogue designer application server 188 provides tools to manipulate and analyze data produced by the mobile device 104 that is provided to the server side system 108.

Figure 2:
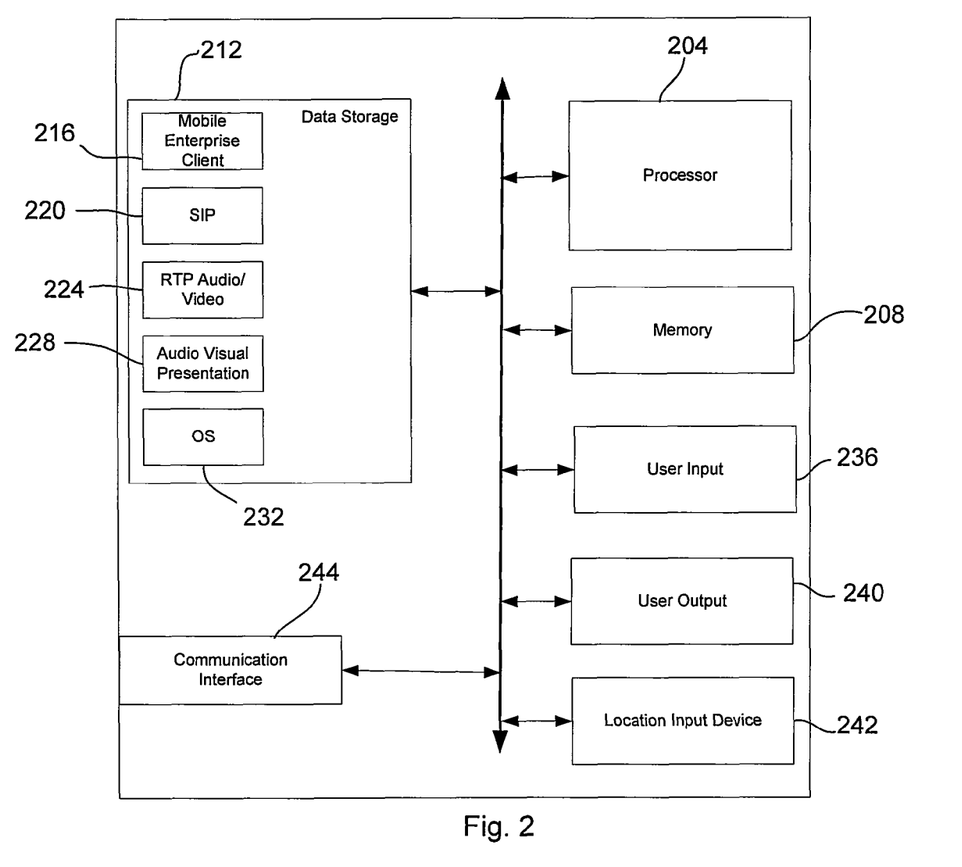
FIG. 2 is a block diagram depicting a mobile communication device in accordance with embodiments of the disclosed invention.

With reference now to FIG. 2, aspects of a mobile communication device 104 included in a communications system 100 are illustrated. In general, a mobile communication device 104 includes a processor 204 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing various of the functions performed by the mobile communication device 104. As will be described in greater detail elsewhere herein, such functions may include the support of communications sessions, the display of content, the generation of location data, and the receipt of touch data.

A mobile communication device 104 may additionally include memory 208 for use in connection with the execution of programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present invention, data storage 212 can contain program instructions or code implementing various of the applications executed by the mobile communication device 104, and data that is used and/or generated in connection with the execution of applications. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read only storage.

Examples of application programming or instructions that can be stored in data storage 212 include a mobile enterprise client 216. The mobile enterprise client 216 may function to adapt the mobile communication device 104 to the mobile customer service server 136, or to otherwise support communications between the mobile communication device 104 and the mobile customer service server 136. In addition, the mobile enterprise client 216 can operate to deliver location data and/or touch data to a mobile customer service server 136 over a communication network 112. Another example of application programming or instructions that can be stored in data storage 212 includes a session initiation protocol (SIP) module 220. As can be appreciated by one of skill in the art, a SIP module 220 can be provided to support communications involving the mobile communication device 104 over a communication network 112 comprising a session initiation protocol network. A mobile communication device 104 may additionally include a real time protocol (RTP) audio/video module 224. In general, an RTP audio/video module 224 operates to support real time audio and/or video communications. In accordance with still other embodiments, the data storage 212 of a mobile communication device 104 may store an audio visual presentation application or module 228. Examples of audio visual presentation applications 228 include a SMIL or flash component to provide a means by which video can be displayed to a user of the mobile communication device 104. Data storage 212 may also provide a storage for operating system software 240.

A mobile communication device 104 also generally includes one or more user input devices 236. Examples of user input devices include a touch screen display, capable of receiving touch data. Other examples of user input devices 236 include a keyboard, a pointing device combined with a display screen or other position encoder, a microphone or other audible input device, and a keypad. In addition, a mobile communication device 104 generally includes one or more output devices 240. Examples of user output devices 240 include a display, and audio output device, and indicator lamps. In accordance with embodiments of the present invention, a mobile communication device 104 may include a location input device 242. Examples of a location input device include a global positioning system (GPS) receiver or other device capable of providing location information related to the mobile communication device 104. Other examples of a location input device 242 include a barcode reader or radio frequency identification device reader, capable of reading tags or labels associated with a known location. A mobile communication device 104 also generally includes one or more communication network interfaces 244. Examples of communication network interfaces 244 that may be provided as part of a mobile communication device 104 include a packet data network interface, such as a wired or wireless Ethernet interface, a cellular packet data interface, a mobile telephony network interface, and/or other wireless or wire line interfaces.

Figure 3:
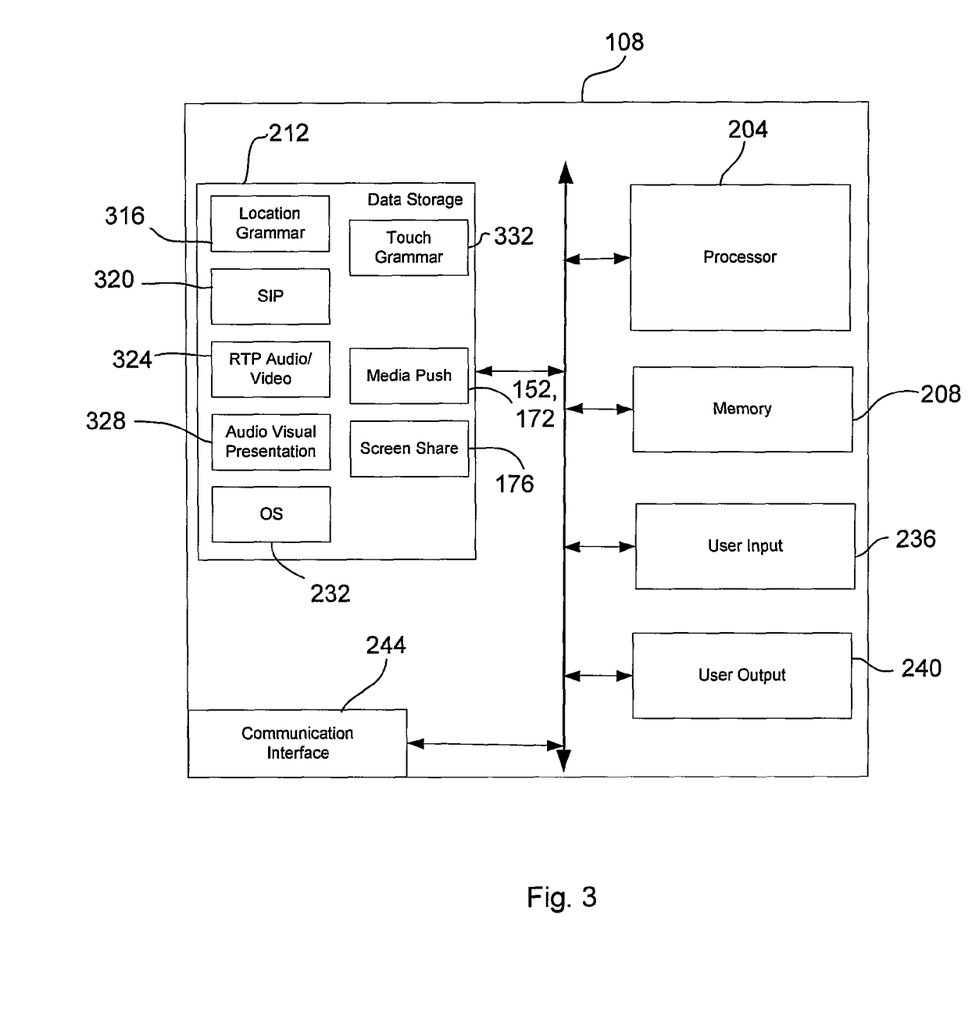
FIG. 3 is a block diagram of servers in accordance with embodiments of the disclosed invention.

FIG. 3 illustrates aspects of server side components 108 in accordance with the disclosed invention. Accordingly, FIG. 3 illustrates components that can be included as part of, for example, a mobile customer service server 136, a voice portal 144, a multimedia server 168, an enterprise data store 180, or a dialogue designer application server 188. However, as can be appreciated by one of skill in the art, the particulars of any one device may differ from others according to the present examples. In general, the server side components 108 includes a processor 204 capable of executing program instructions or software. In addition, a server side component 108 may include memory 208 for use in connection with the execution of programming by the processor 204, and for the temporary or long term storage of program instructions and/or data. Alternatively or in addition, data storage 212 may be provided. Like the memory 208, the data storage 212 associated with a server side component 108 may comprise a solid state memory device. Alternatively or in addition, the data storage 210 may comprise a hard disk drive or other random access memory. In accordance with still other embodiments, the memory 208 may provide random access storage, while some or all of the data storage 212 may comprise read only storage.

Various application programming or instructions can be stored in data storage 212, dependent upon the functionality of the particular server side component 108. Examples of application programming or instructions that can be stored on and/or executed by a server side component 108 include a location grammar module 316. As can be appreciated by one of skill in the art after consideration of the present disclosure, a location grammar module 316 can have different functionality, depending on the particular server side component 108 with which it is associated. For example, in connection with a mobile customer service server, a location grammar module 316 may comprise a location grammar recognizer 140. As another example, a location grammar module 316, in connection with a voice portal server 144, can comprise a location grammar 160 that specifies the grammar containing patterns to be recognized and tokens to be returned in response to recognized patterns that can be provided by the voice portal server 144 to the location grammar recognizer 140 of the mobile customer service server 136. As yet another example, a location grammar module 316 associated with a dialogue designer application server 188 can comprise a location grammar 192 for providing grammar recognition, and for receiving location grammar information from a voice portal server 144. A server side component 108 may also include an RTP audio/video module 324. For example, a multimedia agent server 168 can include an RTP audio/video module 324 to support real time two-way voice and/or audio/video communications between an agent associated with the multimedia agent server 168 and the mobile communication device 104. As another example, an RTP audio/video module 324 may be included in a voice portal 144 as an RTP audio/video component 152 that is capable of receiving and/or providing voice and/or audio/visual data between a voice portal server 144 and a mobile communication device 104.

An audio/visual presentation module 328 can be provided to support the provision of audio/visual content, such as multimedia content, to a mobile communication device 104. For example, an SMIL redirect component 156 can be associated with a voice portal server 144. Other examples of audio/visual presentation modules 328 that can be associated with server side components 108 include flash or other audio/visual presentation software. Yet another example of application programming that can be associated with a server side component 108 includes a touch grammar module 332. With respect to a voice portal server 144, the touch grammar module 332 can comprise a touch grammar 164 that specifies the grammar to the mobile customer service server 136 with respect to touch data received from a mobile communication device 104. With respect to a dialogue designer application server 188, a touch grammar module 332 may comprise touch grammar 196 that can provide basic touch grammar recognition service, and that provides tools in a runtime environment to support the manipulation and analysis of touch data produced by the mobile communication device 104. A multimedia push module 152, 172 can also be included. With respect to a voice portal 144 or a multimedia agent server 168, a multimedia push module 152, 172 can provide multimedia content to a mobile communication device 104.

A screen share module 176 is another example of a module that can be associated with a multimedia push server 168. The screen share module 176 can comprise a whiteboard or other application that allows one party to a communications session to share information with another. Although various modules have been described in association with particular server side components 108, the examples given herein are not intended to be limiting. In particular, one of skill in the art can appreciate that different modules can be deployed in association with different server side components 108, in various combinations or divisions.

A server side component 108 can also include user input 236 and user output 240 devices or components. For example, a multimedia server 168 can provide user input 236 and user output 240 components to support real time communications between an agent and a user of a mobile communication device 104, either directly or via an interconnected agent workstation. A server side component 108 also generally includes a communication interface 244 for interconnecting the server side component 108 to another server side component 108, either directly or through a communication network 112. The communication interface 244 can also provide connection to a server side component 108 to a wireless communication device 104 through the communication network 112, either directly or through another server side component 108.

Figure 4:
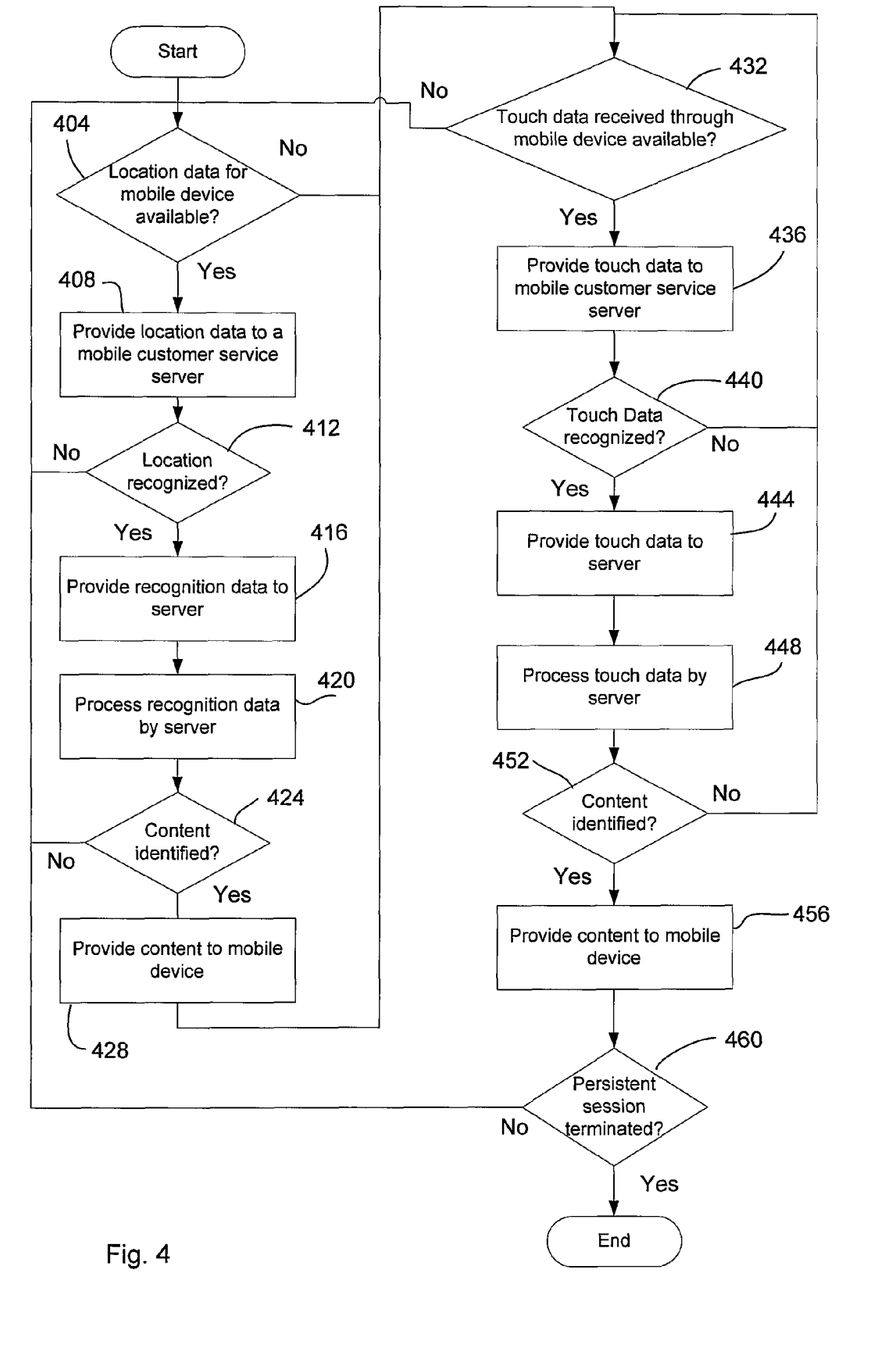
FIG. 4 is a flowchart illustrating aspects of the operation of a communications system in accordance with embodiments of the disclosed invention.

With reference now to FIG. 4, aspects of the operation of a communications system 100 in accordance with the present disclosure are illustrated. Initially, a determination is made as to whether location data for a mobile communication device 104 is available (step 404). If location data for a mobile communication device 104 is available, location data is provided to a mobile customer service server 136. In particular, location data for the mobile communication device 104 is provided to the mobile customer service server 136 through the communication network 112. As can be appreciated by one of skill in the art, the location data can be generated by a component of the mobile communication device 104. For example, a mobile communication device 104 may include a global positioning system (GPS) receiver that provides global positioning system signals to enable the determination of the mobile communication device 104, and the generation of location data. In accordance with further embodiments, a mobile communication device 104 can provide location identification information in the form of a tag having a determined location that can be looked up, either by a server side component 108, or by the mobile communication device 104. In such an instance, the location data input device can include a radio frequency identification device, a barcode reader, or input received from a user, for example through a touchpad or touch sensitive display. In accordance with still other embodiments, location data can be determined in relation to components of the communication network 112 to which the mobile communication device 104 is interconnected. For example, location information related to the mobile communication device 104 can be obtained from information identifying a wireless base station with which the mobile communication device 104 is in communication.

At step 408, the location data is provided to a mobile customer service server 136. The mobile customer service server 136 may then apply the location data to the location grammar recognizer module 140 of the mobile communication service server 136, to determine whether the location is recognized (step 412). If the location is not recognized, the process may return to step 404, to determine whether additional location data for the mobile communication device 104 is available. If the location is recognized, recognition data is provided to a server (step 416). The recognition data can include information identifying a particular location, or attributes of the location. Moreover, the recognition data can be formatted according to the location grammar 160, 192 defined or utilized by the server to which the recognition data is provided. Moreover, the server receiving the recognition data need not have a native ability to receive location data as an input. The processing of the location data is performed by the mobile customer service server, in cooperation with the location grammar recognizer 140 to recognize a location associated with the location data received from the mobile communication device 104, and to provide recognition data that can be operated on by the receiving server side component 108 (i.e., the component to which the mobile customer service server 136 delivers the recognition data).

The recognition data can then be processed by the receiving server side component 108 (step 420). Examples of the processing of the recognition data can include associating content, including multimedia content, with the recognition data. This can include selecting a relevant item of content from a plurality of items of content available to the server side component 108 for delivery to the mobile communication device 104. Moreover, the content that is delivered can include multimedia content, textual content, audio content, text, interactive content, or other content. Processing of the received recognition data can also include providing location information to an agent. For example, recognition data can include an identification of a category or type of goods in a retail establishment in an area of that establishment corresponding to the location of the mobile communication device 104. An agent, such as a human agent, can then use that information to identify content that is or may be of interest to the user of the mobile communication device 104.

At step 424, a determination may be made as to whether content has been identified in response to the recognition data generated from the location information. If content has not been identified, the process may return to step 404, to look for additional location data related to the mobile communication device 104. If content has been identified, that content can be provided to the mobile communication device 104 (step 428). Providing content to the mobile device 104 can include pushing multimedia content from a multimedia push component 172 of a multimedia agent server 168, providing or displaying information through a screen share application 176 of a multimedia agent server 168, as part of a real time communication session with an agent, or to provide recorded content. Other examples include providing a presentation from a voice portal server 144, for example as RTP audio/video 152 or an SMIL redirect 156 presentation provided by a voice portal server 144. Providing content may additionally include establishing communications between a user of the mobile communication device 104 and an agent associated with a multimedia agent server 168. For example, through a screen share application 176, an agent may interactively provide content to the user of the mobile communication device 104. As another example, a human agent associated with a server side component 108, such as a multimedia agent server 168, can establish a real time communication session with the user of the mobile communication device 104, such as a voice or video telephony session.

After providing content to the mobile communication device 104, or after determining that location data for the mobile communication device is not available, a determination may be made as to whether touch data received through the mobile communication device 104 is available (step 432). If touch data is received, that data may be provided to the mobile customer service server 136. Examples of touch data include selections made by a user of a mobile communication device 104 regarding desired content. For example, the user of the mobile communication device 104 may be presented with buttons by a touch screen display that can be selected by the user, where each button indicates a different operation or category or item of content. In accordance with still other embodiments, touch data can include data entered by the user of the mobile communication device 104, for example through a keypad or touch screen display.

At step 440, a determination is made as to whether the touch data has been recognized by the mobile customer service server 136. If the touch data has not been recognized, the process may return to step 432, to determine whether additional touch data is available. If the touch data has been recognized, the recognized data is provided to a server included in the server side components 108 (step 444). In accordance with embodiments of the present disclosure, the server side component 108 that is provided with recognized touch data by the mobile customer service server 136, does not need to itself have the capability of recognizing touch data. Instead, that capability is provided by the mobile customer service server 136 and the touch data recognition capabilities of the mobile customer service server 136. The touch data can then be processed by the server side component that receives the touch data from the mobile customer service server 136 (step 448). Processing of the touch data can include determining whether content available to the server side component 108 is identified that is responsive to the received touch data (step 452). For example, the touch data can include an indication by the user of the mobile communication device 104 that information regarding a particular topic is requested. Moreover, the touch data may request the particular content specifically. In accordance with still other embodiments, the requested content may be inferential or may otherwise not itself specify a particular item of content. In accordance with embodiments of the present disclosure, a particular item of content can be identified by a combination of recognition information generated from location data and touch data that has been recognized by the mobile customer service server 136. As an example, items of content related to an area of a retail establishment that location data indicates a mobile communication device 104 is in can be used to populate a plurality of selectable items in a display screen of the mobile communication device 104. The user of the mobile communication device 104 may then provide a touch input comprising a selection of one of the selectable items, indicating the particular content that is of interest or to or desired by the user of the mobile communication device 104. The indicated item of content, thus identified, can then be provided to the mobile communication device 104. Accordingly, at step 456, the identified content is provided to the mobile communication device 108.

At step 460, a determination is made as to whether the persistent session established between the mobile communication device 104 and the server side components 108 has been terminated. If the persistent session has not been terminated, the process may return to step 404. If the persistent session has been terminated, the process may end. As can be appreciated by one of skill in the art from the present disclosure, a persistent session can comprise a number of discrete sessions. For example, a persistent session can include the provision of information regarding the location of a mobile communication device 104 to a mobile customer service server 136. The provision of such information can comprise a discrete session. Upon receiving the location information, that information can be processed by the server side components 108. After processing, an item of content can be returned to the mobile communication device 104. That item of content can be a discrete set of information that is delivered to the mobile communication device 104. Still another discrete session can comprise an input by the user of the mobile communication device 104, for example selecting an item presented by the content delivered to the mobile communication device 104. The input, which can comprise a touch input, is processed by the mobile customer service server 136, and can be used to select further content for delivery in yet another session. As yet another example, at any point, a live (i.e., a human) agent may, through a server side component 108, and in response to location and/or touch data received from the mobile communication device 104, establish a communications session with the user of the mobile communication device 104, for example using a real time communications protocol. Accordingly, it can be appreciated that smaller sessions comprising a larger persistent session can be separated in time.

As can be appreciated by one of skill in the art from the present disclosure, a system that integrates various customer service systems comprising server side components 108 are provided. The server side components 108 can include interactive voice and video response systems, multimedia systems, and human agents. In addition, the mobile customer service server 136, in cooperation with other components, can recognize location data and/or touch data, and act as an adapter for various server side component servers that do not natively support recognition of location data or touch data.

One illustrative example is a user of a mobile communication device 104 in a consumer electronics retail store. Information regarding the location of the mobile communication device 104 is provided to the mobile customer service server 136. That information can result in the generation of recognition data comprising communication that the user of the mobile communication device 104 is looking at televisions. Based on this recognition information, a particular item of content, such as content presenting selectable items, such as items to select information about featured televisions, peripheral devices, or help can be selected. The user of the mobile communication device 104 may then make a selection, for example through touching a selectable item presented by a touch screen display, resulting in the generation of touch data. The mobile customer service server 136 can then process the touch data, to determine further action. For example, if the user makes a selection to speak with an agent, a real time communications session with a human agent can be established.

In another exemplary working scenario, insurance customer has an auto accident. Quick claim processing can be processed through the AMCC. Additionally, authorities can be optionally notified, and the phone locator services can be utilized, in cooperation with the camera, in a simple application to initiate the claim process. Moreover, an agent can be brought on-line to answer specific questions or requests clarification of a situation. Through map collaboration, the consumer can tell the agent the exact accident timeline. The agent is able to review the scene photos and, for example, request additional photos and/or video information, while the consumer may still be at the scene. Furthermore, the agent can offer towing services based on the location and prearranged estimate scheduling, both of which can be derived from the mobile phone, for example with the cooperation of a GPS module, and a review of the consumer's calendar on the mobile device.

In still another exemplary scenario, an airline passenger is in the airport and clicks the dedicated airline application to see their current flight status. One click can get the airline customer for example, an airport map, lounge information, restaurant information, or the like. Moreover, one click could connect the airline passenger to an agent and if no agent is available, visual on hold information and touch enabled IVR can be provided to the airline passenger until an agent is ready.

In yet another exemplary scenario, a home improvement customer is in a home improvement warehouse and clicks dedicated home improvement application for help. Visual menu options can be provided on the mobile device, as well as a voice search capability provided to find location of an item, with a corresponding visual map presented and directions to guide the user to the requested item. This one click concept could be further extended to request in store assistance, as well as back-end an expert shopper.

In a further exemplary scenario, the problem is collection of user generated content from a central context aware application. For example, a television station needs early-on scene reporting. The mobile communication device, operating as the client, can connect to an IVR interface, walk a reporter through signing in using, for example, speech to enter subject and story tag information. Location information can be automatically generated and used for context of the story. In addition, notifications can be automatically sent to other reporters in the area. The reporter can then begin the story as either, for example, a video blog or real-time streaming back to the station's servers, for subsequent broadcast.

For a newspaper that desires to open up general public reporting, the system capabilities can be leveraged such that the mobile communication device connects users to an IVR interface for submitting user generated stories. The process can be automated utilizing device detail such as location, video information, audio information, and the like.

In another exemplary mobile context center use, a customer goes to an electronics merchant. The customer arrives at the electronics merchant and starts a dedicated electronic merchant application on their mobile communication device. This triggers a context aware kiosk included as part of the server side components to display customer information, store specials, or in general any information targeted to that specific customer. Next, the consumer walks up a particular flat panel TV that they are interested in. However, desiring more information, the customer enters the model number in search window on the mobile device. The server then displays the results of the search with, for example, store inventory information. The consumer, requiring connection information, presses the "call agent" button for further assistance. This triggers a call from the mobile customer service server to be placed to next available contact center agent. A current query could also be sent to an agent desktop. In this case, the agent answers the call and asks how he can help the consumer with the particular TV they had inquired about. The consumer can then ask via the interface on the mobile device how to connect her DVD player to the TV. Content pushed to the mobile communication device can show a picture of the DVD player, and controls available to zoom in or out the displayed picture. The agent can then look up previous purchases to find the DVD player that the consumer had previously purchased, and pushes a photo of the player to the consumer to verify this is the DVD player they are inquiring about. The customer can confirm and ask for connection instructions from that DVD player to the TV. The mobile customer service server can launch an interface that provides sharing with the agent, including drawing and pointing capabilities. Once the agent starts the sharing of a connection, pointing and drawing capabilities are also enabled at his work station. The consumer can then continue shopping, with the mobile system providing a shopping list of cables that can be used with a check box next to each to ensure the necessary cables are purchased. Once completed, the agent pushing the shopping list of cables can notify the store to prepare the TV and have it waiting at the register. The consumer, upon arriving at the register, arrives at the check out where the TV is waiting, pays, and loads the goods in her vehicle.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for providing content, comprising:
generating location data associated with a mobile device;
providing the location data from the mobile device to a mobile customer service server;
providing to the mobile customer service server a location grammar;
recognizing by the mobile customer service server a pattern specified by the location grammar in the location data, wherein the pattern is associated with recognition data;
providing the recognition data associated with the location data to a voice portal;
at the voice portal, processing the recognition data associated with the location data, wherein processing the recognition data associated with the location data at the voice portal includes:
identifying a first item of content from a plurality of items of content using the recognition data associated with the location data;
pushing the first item of content to the mobile device, wherein pushing the first item of content to the mobile device includes:
pushing at least one of audio, video, text, or multimedia content to the mobile device;
displaying the first item of content by the mobile device, wherein the displayed content includes at least a first user selectable item;
receiving from a user of the mobile device a touch input selecting the first user selectable item;
providing to the mobile customer service server a signal responsive to the touch input;
recognizing by the mobile customer service server the touch input, wherein the touch input is associated with the recognition data;
providing the recognition data associated with the touch input to the voice portal; and
at the voice portal, processing the recognition data associated with the touch input.

2. The method of claim 1, wherein processing the recognition data associated with the touch input at the voice portal includes:
identifying a second item of content from the plurality of items of content using the recognition data associated with the touch input;

pushing the second item of content from the voice portal to the mobile device.

3. The method of claim 1, wherein processing the recognition data associated with the touch input at the voice portal includes:
displaying information to an agent responsive to the touch input.

4. The method of claim 3, further comprising:
in response to the information responsive to the touch input, the agent selecting a second item of content;
pushing the second item of content to the mobile device.

5. The method of claim 4, further comprising:
establishing a real time protocol communication between the agent and the user of the mobile device.

6. A method for providing content, comprising:
generating location data associated with a mobile device;
providing the location data from the mobile device to a mobile customer service server;
providing to the mobile customer service server a location grammar;
recognizing by the mobile customer service server a pattern specified by the location grammar in the location data, wherein the pattern is associated with the recognition data;
providing the recognition data associated with the location data to a voice portal; and
at the voice portal, processing the recognition data associated with the location data;
receiving at the mobile device a touch input from a user of the mobile device, wherein the touch input is provided to the mobile customer service server, wherein the touch input is associated with the recognition data;
providing the recognition data associated with the touch input to the voice portal; and
at the voice portal, processing the recognition data associated with the touch input.

7. A method for providing content, comprising:
generating location data associated with a mobile device;
providing the location data from the mobile device to a mobile customer service server;
providing to the mobile customer service server a location grammar;
recognizing by the mobile customer service server a pattern specified by the location grammar in the location data, wherein the pattern is associated with recognition data;
providing the recognition data associated with the location data to a voice portal; and
at the voice portal, processing the recognition data associated with the location data, wherein processing the recognition data associated with the location data at the voice portal includes:
establishing a real time protocol communication between the voice portal and the mobile device, wherein the recognition data associated with the location data is provided to an agent associated with the voice portal, and wherein the real time protocol communication is between the agent and a user of the mobile device.

8. A communication system, comprising:
a mobile device, including:
a processor,
memory;
at least one of a location and a touch input;
a mobile enterprise client; and
a communication interface; and
a mobile customer service server, including:
a processor,
memory;
a location grammar recognizer; and
a communication interface, wherein the mobile customer service server is in communication with the mobile device, wherein at least one of location data and touch data received at the mobile device is processed by the mobile enterprise client and is communicated to a voice portal associated with the mobile customer service server, wherein the mobile customer service server associates the at least one of location data and touch data with recognition data, wherein the voice portal associated with the mobile customer service server processes the recognition data, and wherein, in response to the at least one of location data and touch dat,a content is provided to the mobile device.

9. The system of claim 8, further comprising:
a multimedia agent, wherein the multimedia agent selects the content provided to the mobile device in response to the at least one of location data and touch data.

10. The system of claim 9, wherein the content selected by the multimedia agent provided to the mobile device in response to the at least one of location data and touch data includes content associated with an automated session.

11. The system of claim 10, wherein the automated session utilizes the real time protocol communication and includes at least one of a text-to-speech, automated speech recognition, or interactive voice response session.

12. The system of claim 8,
wherein the voice portal includes:
a processor,
memory;
a location grammar module;
a touch grammar module, wherein the voice portal selects the content provided to the mobile device in response to the at least one of location data and touch data.

13. The system of claim 12, further comprising:
a dialog designer application server, including:
a processor,
memory;
a location grammar module;
a touch grammar module, wherein the dialog designer application server is provided with at least one of location data and touch data by the voice portal, wherein the dialog designer application server analyzes the at least one of location data and touch data and returns data recognizable to the voice portal.

14. The system of claim 8,
wherein the voice portal includes:
a processor,
memory;
a location grammar module;
a touch grammar module, wherein the voice portal selects the content provided to the mobile device in response to a first instance of the at least one of location data and touch data;
a multimedia agent, wherein the multimedia agent selects the content provided to the mobile device in response to a second instance of the at least one of location data and touch data.

15. The system of claim 8, wherein the location data is related to a location of the mobile device, wherein the communication between the mobile device and the mobile customer service server is maintained over a plurality of discrete communication sessions, and wherein the plurality of discrete communication sessions comprise a pervasive connection between the mobile device and the mobile customer service server.

\* \* \* \* \*

UNITED STATES PATENT AND TRADEMARK OFFICE
CERTIFICATE OF CORRECTION

PATENT NO. : 8,718,622 B2  
APPLICATION NO. : 12/888225  
DATED : May 6, 2014  
INVENTOR(S) : George Erhart et al.

Page 1 of 1

It is certified that error appears in the above-identified patent and that said Letters Patent is hereby corrected as shown below:

IN THE CLAIMS

Column 14, Line 16; delete "dat,a" and add "data" therein.

Signed and Sealed this
Ninth Day of February, 2016

Michelle K. Lee
*Director of the United States Patent and Trademark Office*